United States Patent [19]

Potter

[11] 4,405,926
[45] Sep. 20, 1983

[54] METHODS AND APPARATUS FOR WARNING AIRCRAFT OF THE PRESENCE AND DIRECTION OF ELECTRICAL TRANSMISSION LINES

[75] Inventor: Keith E. Potter, Malvern, England

[73] Assignee: The Secretary of State for Defence in Her Britannic Majesty's Government of the United Kingdom of Great Britain and Northern Ireland, London, England

[21] Appl. No.: 147,295

[22] Filed: May 6, 1980

Related U.S. Application Data

[63] Continuation of Ser. No. 816,515, Jul. 8, 1977.

[30] Foreign Application Priority Data

Jul. 12, 1976 [GB] United Kingdom ............... 28968/76

[51] Int. Cl.³ ............................................. G01S 5/04
[52] U.S. Cl. ................................. 343/123; 343/112 D
[58] Field of Search ..................... 343/119, 123, 112 D

[56] References Cited

U.S. PATENT DOCUMENTS 3,046,549 7/1962 Kalmus ........................... 343/123 X
3,344,430 9/1967 Hildebrand ...................... 343/119 X
3,774,216 11/1973 Coleman et al. .................... 343/119

FOREIGN PATENT DOCUMENTS 399957 10/1933 United Kingdom.
1056768 1/1967 United Kingdom.

Primary Examiner—Theodore M. Blum
Attorney, Agent, or Firm—Cushmam, Darby & Cushman

[57] ABSTRACT

Electrical transmission lines are a collision hazard to low-flying aircraft, especially helicopters. Warning of the proximity and bearing of such lines is provided by equipping the aircraft to detect the alternating magnetic flux produced by such lines. The bearing is indicated by intercepting the horizontal flux component by two coils mounted in a vertical plane at right angles to one another. The ratio of the signals induced in the two coils is a measure of the bearing of the flux source. The induced AC signals are amplified and rectified, and their ratio is compared with predetermined ratio values corresponding to given bearing sectors. The output conditions thus obtained, together with a quadrant-identifying signal obtained by multiplying together the two AC signals, are gated to illuminate that element of a directional display corresponding to the sector in which the bearing lies. Early warning is provided by a third coil which intercepts the larger vertical flux component. Foreaft ambiguity is resolved by the relative amplitudes of signals from two pairs of such coils spaced apart along the aircraft, or by differentiating the rectified signal from a single pair.

22 Claims, 1 Drawing Figure

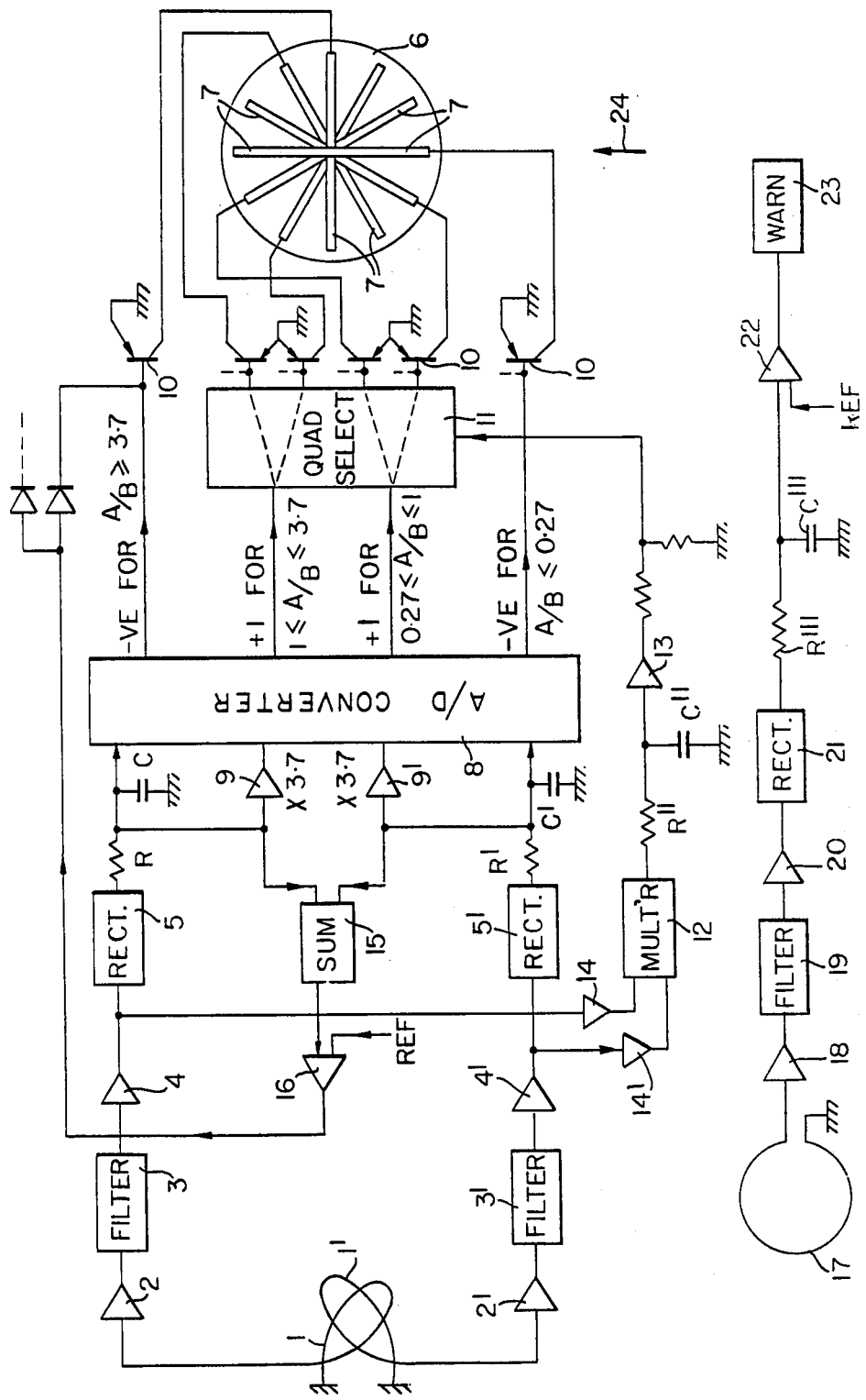

METHODS AND APPARATUS FOR WARNING AIRCRAFT OF THE PRESENCE AND DIRECTION OF ELECTRICAL TRANSMISSION LINES

This is a continuation of application Ser. No. 816,515 filed July 8, 1977.

BACKGROUND OF THE INVENTION

This invention relates to methods of, and apparatus for, indicating the direction of a source of magnetic flux.

The invention has particular application in preventing low-flying aircraft, especially helicopters, from colliding with the electrical power transmission lines which run across the country, eg suspended from pylons. These lines are not easy to see, and present a considerable hazard to such aircraft. The present invention provides apparatus which can detect the presence of such lines and indicate at least their approximate direction, alerting the pilot to keep a good look-out in that direction and to take avoiding action.

The invention operates by detecting the low-frequency (50 Hz in the UK) magnetic flux produced by such lines. Transmission lines normally comprise separate cables carrying each of three phases. With perfectly balanced phases (equal currents in each phase), the net magnetic flux at a sufficient distance from the line would be zero, ie at such a distance that the spatially separated cables appeared as a "point" source. It has been found, however, that there is usually sufficient current imbalance between the phases, eg up to 10 or 15%, to produce sufficient net flux to be detectable at a useful distance. Moreover, at distances closer to the line the latter does not appear as a "point" source.

Although the direction of maximum magnetic flux in the plane parallel to the ground and which contains the line is mainly vertical, as may be appreciated by considering the line as a single current-carrying conductor, this vertical component of flux cannot be utilised to give directional information. It is found, however, that owing to the aforesaid imbalance between the currents in the cables, and to the fact that at distances of interest the line is not a "point" source, there is a horizontal component of flux in the aforesaid plane of the transmission line of sufficient strength to enable its direction to be detected. This flux is, however, quite small, eg normally several orders of magnitude less than the "DC" flux due to the earth's magnetic field.

SUMMARY OF THE INVENTION

According to the present invention, a method of indicating the direction of a source of alternating magnetic flux, particularly an electrical power transmission line, comprises:

intercepting the horizontal component of said magnetic flux by two coils each mounted in a generally vertical plane and at an angle to one another;

deriving two signals proportional to the emf's induced in the respective coils by said flux;

and utilising the ratio of said two signals to indicate the direction of the source of the flux.

Also according to the present invention, apparatus for indicating the direction of a source of alternating magnetic flux, particularly an electrical power transmission line, comprises:

two coils mounted in a generally vertical plane and at an angle to one another to intercept the horizontal component of said magnetic flux;

means for deriving two signals proportional to the emf $\propto$ s induced in the respective coils by said flux;

and means for utilising the ratio of said two signals to indicate the direction of the source of the flux.

The two coils are preferably mounted at right angles to one another, since this makes the relationship between the signal ratio and the source direction a simple trigonometrical one.

The use of a pair of loop aerials at right angles to one another for measuring the direction of electromagnetic radio transmissions is, of course, well known. In the present invention, however, the signal detected is not a propagated RF electromagnetic radiation but the "static" 50 Hz circumferential purely magnetic field produced by the currents flowing in the line. If $Ve^{j\omega t}$ is the emf induced in one coil when the magnetic flux lines are normal to the plane of that coil, then if the flux makes an angle $\theta$ with this normal, the induced emf is $Ve^{j\omega t} \cos\theta$ while the emf induced in the other coil is $Ve^{j\omega t} \sin\theta$. (It will be noted that this is the reverse of the situation with propagated electromagnetic radiation; the corresponding induced signals in the two loop aerials are then proportional to $\sin\theta$ and $\cos\theta$ respectively, where the same angle $\theta$ is the direction of the received radiation). The ratio of the two signals is thus proportional to $\tan\theta$.

The two AC signals obtained from the coils may be displayed directly, after suitable equal amplifications, to indicate the direction of the magnetic source, eg by applying the signals to the X and Y plates of an oscilloscope, when the slope of the resulting trace indicates the value of $\theta$. In order to obtain a simple, compact, low-voltage instrument, it is preferred, however, to avoid the use of cathode-ray tubes and to process the signals in such a way as to display in which of a predetermined number of angular sectors the direction of the source lies. The compact electroluminescent displays now available are suitable for this purpose, or for better visibility a brighter display can be used, eg involving filament bulbs.

Thus the present apparatus may comprise means for rectifying the amplified AC signals from each coil to produce corresponding DC signals, and means, including analogue-to-digital converter means, for comparing the ratio of the two DC signals with predetermined ranges of the value of said ratio, each predetermined range of values corresponding to a given directional angular sector, whereby to produce predetermined output conditions at a plurality of output connections dependent upon the value of the ratio. Said output connections may be linked to the input connections of a directional display comprising a corresponding plurality of separately energisable visible elements.

With the two coils at right angles, the numerical value of the ratio of the two signals leaves unresolved in which of two adjacent 90° quadrants the direction of the source lies, eg whether to left or right of the line of flight of the helicopter. This information is obtainable from the relative phases of the AC signals from the two coils; in one quadrant they are in phase, in the adjacent quadrant in anti-phase. (There then still remains a 180° ambiguity, ie whether the source is ahead of or behind the aircraft, which will be referred to later). Accordingly the present apparatus may comprise means for deriving from the two amplified AC signals a quadrant-identifying signal, and means for combining the quadrant-identifying signal with the outputs of said analogue-to-digital converter means to produce output conditions corresponding to the appropriate quadrant. The means for deriving the quadrant-identifying signal may comprise means for multiplying together the two amplified AC signals, the condition of the multiplier output thereby depending on whether the two AC signals are in phase or in antiphase.

The directional display may be of known form and may comprise a plurality of illuminatable (eg electroluminescent) elements (eg six) oriented diametrically with respect to a common centre and angularly spaced apart.

Mention has been made that the vertical component of magnetic flux density is greater than the horizontal component. This fact may be utilised to give early warning of the presence of a power line, though not its direction, by arranging a third coil in a generally horizontal plane, whose output after amplification is applied to operate a visible or audible warning device.

It may also be arranged that the appropriate element of a visible display, eg the appropriate element of the above-described electroluminescent display, is not illuminated until the input signals have reached a threshold level. This may be arranged by summing the two rectified AC signal outputs and comparing the sum with a predetermined level so that the display is illuminated only when the sum exceeds the latter level.

Mention has also been made of the 180° ambiguity in the direction of the magnetic flux source in the present apparatus as so far described. Resolution of this ambiguity is not essential, because in general the pilot is mainly concerned with what lies in his path ahead, rather than what lies behind him. However, means may be provided for resolving this ambiguity if desired. For example two pairs of coils as aforesaid can be used, located sufficiently far apart along the length of the aircraft, eg at nose and tail. The relative amplitudes of the induced signals from each pair of coils then indicates which end of the aircraft is closer to the source and hence whether the source is ahead or behind. Alternatively the rectified outputs from a single pair of coils can be summed and differentiated with respect to time. The polarity of the differentiated signal then indicates whether the signal is increasing or decreasing, ie whether the aircraft is approaching or leaving the source. In either case the ambiguity is only resolved if the flux direction is not at 90° to the fore-aft axis of the helicopter. If the flux is in this direction, the ambiguity can be resolved by the pilot rotating the aircraft in either direction to change this situation.

DESCRIPTION OF THE DRAWING

To enable the nature of the present invention to be more readily understood, attention is directed, by way of example, to the accompanying drawing, which is a block schematic circuit diagram of apparatus embodying the invention.

DESCRIPTION OF PREFERRED EMBODIMENT

In this drawing two coils 1 and 1' are mounted in a convenient position on a helicopter (not shown), with the plane of the coils vertical. The two coils are at right angles to one another, with the plane of one of the coils parallel to the fore-aft axis of the helicopter. The coils may be about 6 inches in diameter and may each comprise about 8000 turns, though the number may be reduced by including a ferromagnetic core.

The 50 Hz emf induced in each coil by the magnetic flux from an adjacent power line is fed to matched channels comprising low-noise preamplifiers 2,2' suitably having a gain of about 10, active filters 3,3' having a pass-band of 50 Hz±2 Hz and a gain of about 10 to reject unwanted frequencies, main amplifiers 4,4' having a gain of about 100 to bring the signal level to a few volts, and full-wave operational-amplifier rectifiers 5,5'. The latter form of rectifier is known to give linear rectification down to very low signal levels. The outputs of rectifiers 5,5' are smoothed by resistors R,R' and capacitors C,C'.

As explained earlier, the ratio of these two outputs is the tangent of the angle $\theta$ where $\theta$ is the angle which the horizontal component of the lines of magnetic flux make with the normal to the plane of one of the coils. In the present embodiment the exact value of $\theta$ is not displayed. For simplicity and clarity the display indicates in which of six directional angular sectors the flux source lies.

The display is shown at 6, which represents an electroluminescent display of known form. It comprises six electroluminescent elements 7 equiangularly oriented like the spokes of a wheel and separately energisable by application of a voltage thereto. Illumination of each of these "spokes" indicates that $\theta$ lies within the corresponding angular sector relative to the fore-aft axis of the helicopter.

The value of tan $\theta$, ie the ratio of the signal amplitudes, for illumination of each "spoke" is given in the following Table:

| Spoke illuminated | $\theta$ | tan $\theta$ | Other conditions |
|---|---|---|---|
| 12–6 o'clock | $-15° \leq \theta \leq 15°$ | $0 \leq |\tan \theta| \leq 0.27$ | With the 1,1' signals in phase |
| 1–7 O'clock | $15° \leq \theta \leq 45°$ | $0.27 \leq |\tan \theta| \leq 1.0$ | |
| 2–8 o'clock | $45° \leq \theta \leq 75°$ | $1.0 \leq |\tan \theta| \leq 3.7$ | |
| 3–9 o'clock | $75° \leq \theta \leq 105°$ | $3.7 \leq |\tan \theta| \leq 0.0$ | |
| 4–10 o'clock | $105° \leq \theta \leq 135°$ | $1.0 \leq |\tan \theta| \leq 3.7$ | With the 1,1' signals in anti-phase |
| 5–11 o'clock | $135° \leq \theta \leq 165°$ | $0.27 \leq |\tan \theta| \leq 1.0$ | |
| 6–12 o'clock | $165° \leq \theta \leq 195°$ | $0 \leq |\tan \theta| \leq 0.27$ | |

The 12–6 o'clock spoke corresponds to the fore-aft axis of the helicopter, as indicated by arrow 24.

The circuitry for illuminating the appropriate element 7 dependent on the signal ratio comprises an analogue-to-digital converter 8 which receives four signal inputs. Two of these inputs are the output of rectifiers 5,5' and two are these outputs multiplied by the factor 3.7 (which is also the reciprocal of 0.27) by means of amplifiers 9,9'. Converter 8 comprises operational-amplifier comparator circuits followed by suitable logic gates and, in a manner familiar to those skilled in the electronic art, by comparison of the values of these four inputs is arranged to deliver appropriate outputs at its four output connections. The conditions of these outputs, for the corresponding value of A/B (where A/B represents the ratio of the signals induced in coils 1,1', and hence of the outputs of rectifiers 5,5') are shown at relevant output connections as a form of logical "truth table".

The elements 7 are illuminated by the application of negative voltages to transistors 10. the 12–6 o'clock and 3–9 o'clock elements are illuminated by such outputs directly from convertor 8. As noted in the Table, however, there are two values of A/B (ie of tan $\theta$) for which there is an ambiguity as to the quadrant in which the elements are to be illuminated, depending on the relative phases of the 50 Hz signals, eg $0.27 \leq |\tan \theta| \leq 1.0$ can require illumination of either the 1–7 o'clock spoke or of the 5–11 o'clock spoke, depending on the relative input phases. The outputs (shown as logical "1's") corresponding to these two values of A/B are fed to a quadrant selection circuit 11 comprising CMOS logic circuits, which also receives a quadrant-identifying signal whose condition depends on the relative phases of the two 50 Hz induced signals. According to its condition, circuit 11 routes a negative illuminating voltage in a conventional manner to the element 7 of the appropriate quadrant, as shown.

The quadrant-identifying signal is obtained by applying the AC outputs of amplifiers 4,4' via X100 amplifiers 14, 14', to an analogue multiplier 12, whose output, smoothed by R", C", is amplified by an open-loop operational amplifier 13. Consequently with the two AC signals in phase a logical "1" is fed to circuit 11, and with the two in antiphase a logical "0" is fed.

The above phase relationships apply between the two pairs of 180°-opposed quadrants, ie the signals are in phase for quadrants 0°–90° and 180°–270°, and in antiphase for quadrants 90°–180° and 270°–360° (see Table). There is thus a 180° ambiguity in respect of each spoke, ie the apparatus as described does not distinguish between ahead-left and astern-right, or between ahead-right and astern-left. Means for resolving this ambiguity are not shown in the drawing, but circuits suitable for doing so in either of the ways earlier described will be apparent to those skilled in the electronic art.

It is further arranged that the appropriate element 7 is not illuminated until the input signal level has reached a threshold value. For this purpose the outputs of rectifiers 5,5' are summed by an operational amplifier 15 and the sum compared with a reference level in a circuit 16. Until the sum exceeds the reference level, an inhibiting signal is fed by circuit 16 via a diode to each transistor 10 base to prevent an illuminating output condition being produced thereby.

Early warning of the presence of power cables, without indication of direction, is obtained from a single horizontally oriented coil 17 whose output is fed to a channel (similar to that used for coils 1,1') comprising preamplifier 18, filter 19, main amplifier 20, rectifier 21 and smoothing components R''',C'''. The smoothed value is compared with a reference level in circuit 22 and operates an audible or visible alarm 23 when it exceeds the reference level. In a modified form the outputs of rectifiers 5 and 5' may be summed with the output of rectifier 21 for comparison with the reference level.

In a modified form of the circuit shown, the arrangement is the same from the coils 1,1' as far as the rectifiers 5,5' and the subsequent smoothing. Thereafter the amplifiers 9,9' are omitted and replaced by two analogue dividers whose outputs are A/B and B/A respectively. (Two dividers are used to give a greater dynamic operating range). The analogue-to-digital converter circuit 8 is retained but differs internally from that already described so that it produces logical output conditions at its four outputs appropriate to the values of the signal ratios. Selector circuit 11 is retained, together with the circuit (multiplier 21 etc) for providing the quadrant-identifying signal. It is desirable in this modified arrangement to make the amplifiers 4,4' AGC amplifiers whose gain is controlled by the sum of their outputs, because of the smaller dynamic operating range of the divider circuits.

Additionally, it may be arranged that all the spokes flash on and off if the signal level is so high that the direction indication becomes unreliable owing to overloading of the amplifiers. This arrangement may comprise an oscillator (not shown) whose output is connected via diodes to the bases of transistors 10. The oscillator is switched on by a signal derived from a comparator fed with a sum signal, as with the inhibiting signal.

To reduce electrical background noise due to emf's induced by mechanical vibration of the coils in the earth's magnetic field, the coils can be mounted on suitable anti-vibration mountings. To reduce background noise due to the magnetic fields of aircraft generators, the coils are preferably located remote therefrom.

Other possible embodiments of the invention will be apparent to those skilled in the electronic art.

I claim:

1. A method of warning a low-flying aircraft of the presence and direction, with respect to the aircraft, of a plurality of vertically separated electrical power transmission lines comprising:
   intercepting the horizontal component of the resultant magnetic flux from said lines by two aircraft-mounted coils having their axes aligned generally horizontally and at an angle to one another;
   deriving two signals proportional to the emf's induced in the respective coils by said flux;
   and utilising the ratio of said two signals to indicate in the aircraft the direction of the transmission line with respect thereto.

2. A method as claimed in claim 1 wherein the coils are at right angles to one another.

3. A method as claimed in claim 2 comprising:
   amplifying and rectifying the AC signals from each coil to produce corresponding DC signals;
   comparing the ratio of the two DC signals with predetermined ranges of the value of said ratio, each predetermined range of values corresponding to a given directional angular sector;
   and deriving predetermined output conditions at a plurality of output connections dependent upon the value of the ratio.

4. A method as claimed in claim 3 comprising applying said output conditions to energise a directional display comprising a corresponding plurality of separately energisable visible elements.

5. A method as claimed in claim 4 comprising deriving from the two amplified AC signals a quadrant-identifying signal, and combining the quadrant-identifying signal with the signals resulting from said ratio comparison to derive said output conditions.

6. A method as claimed in claim 5 comprising multiplying together the two amplified AG signals to derive said quadrant-identifying signal.

7. A method as claimed in claim 1 comprising intercepting the vertical component by a third aircraft-mounted coil having its axis aligned generally vertically, amplifying the output from the third coil and applying the amplified output to provide an early warning when the amplified output exceeds a predetermined level.

8. A method as claimed in claim 4 comprising summing the signals from said first-mentioned two coils and causing the summed signals to inhibit the energising of said visible elements until said summed signals exceed a predetermined level.

9. A method as claimed in claim 2, for resolving 180° ambiguity, comprising comparing the amplitudes of signals induced in two pairs of said first-mentioned coils similarly oriented and spaced horizontally apart.

10. A method as claimed in claim 2 for resolving 180° ambiguity, comprising differentiating the rectified and summed outputs of said first-mentioned two coils with respect to time and determining the polarity of the differentiated signal.

11. Apparatus for installation in an aircraft to warn of the presence and direction, with respect to the aircraft, of a plurality of vertically separated electrical power transmission lines comprising:

two coils adapted for aircraft mounting with their axes aligned generally horizontally and at right angles to one another;

means for amplifying and rectifying the AC signals from each coil to produce corresponding DC signals;

and means for comparing the ratio of the two DC signals with predetermined ranges of the value of said ratio, each predetermined range of values corresponding to a given directional angular sector, said comparing means being adapted to produce predetermined output conditions at a plurality of output connections dependent upon the value of the ratio.

12. Apparatus as claimed in claim 11 wherein said comparing means comprises analogue-to-digital converter means.

13. Apparatus as claimed in claim 12 wherein said output connections are linked to the input connections of a directional display comprising a plurality of separately energisable visible elements.

14. Apparatus as claimed in claim 12 comprising means for deriving from the two amplified AC signals a quadrant-identifying signal, and means for combining the quadrant-identifying signal with the outputs of said analogue-to-digital converter means to produce output conditions corresponding to the appropriate quadrant.

15. Apparatus as claimed in claim 14 wherein the means for deriving the quadrant-identifying signal comprises means for multiplying together the two amplified AC signal.

16. Apparatus as claimed in claim 12 wherein the directional display comprises a plurality of illuminatable elements oriented diametrically with respect to a common centre and angularly spaced apart.

17. Apparatus as claimed in claim 11 comprising a third coil adapted for aircraft mounting with its axis aligned generally vertically to intercept the vertical component of said alternating flux, means for amplifying the output of the third coil, and early warning means operable by said amplified output when it exceeds a predetermined level.

18. Apparatus as claimed in claim 16 comprising means for summing the signals from said first-mentioned two coils and for inhibiting illumination of any element of said directional display until said summed signals exceed a predetermined level.

19. Apparatus as claimed in claim 11 comprising means for resolving 180° directional ambiguity, said means comprising two pairs of said first-mentioned two coils similarly oriented and spaced apart horizontally, and means for comparing the amplitude of the signals induced in each pair of coils.

20. Apparatus as claimed in claim 11 comprising means for resolving 180° ambiguity, said means comprising means for differentiating the summed outputs from said first-mentioned two coils with respect to time and for determining the polarity of the differentiated signal.

21. Apparatus as claimed in claim 11 when installed in a helicopter, wherein the axis of one of said first-mentioned two coils is parallel to the fore-aft axis of the aircraft and the axis of the other said coil is at right angles to said axis.

22. Apparatus as claimed in claim 21 wherein two pairs of said coils are spaced apart along the fore-aft axis of the aircraft, and comprising means for comparing the amplitude of the signals induced in each pair of coils in order to resolve 180° directional ambiguity.

* * * * *